United States Patent [19]

Peabody et al.

[11] Patent Number: 4,634,403
[45] Date of Patent: Jan. 6, 1987

[54] BELT DRIVE

[75] Inventors: Ralph C. Peabody, Brooklyn Center; Charles E. Grimes, Bloomington, both of Minn.

[73] Assignee: Tennant Company, Minneapolis, Minn.

[21] Appl. No.: 798,962

[22] Filed: Nov. 18, 1985

[51] Int. Cl.⁴ .............................................. F16H 9/00
[52] U.S. Cl. .......................................... 474/1; 474/4; 474/85
[58] Field of Search ...................... 474/1, 4, 5, 85, 133

[56] References Cited

U.S. PATENT DOCUMENTS

| | | | |
|---|---|---|---|
| 899,741 | 9/1908 | Lane et al. | 474/85 |
| 1,790,786 | 2/1931 | Bailey . | |
| 1,803,186 | 4/1931 | Hendrickson . | |
| 1,811,038 | 6/1931 | Amidon . | |
| 2,147,465 | 2/1939 | Siegling . | |
| 2,695,530 | 11/1954 | Calzolari . | |
| 2,718,154 | 9/1955 | Mathson | 74/220 |
| 2,799,175 | 7/1957 | Peck | 74/218 |
| 2,884,796 | 5/1959 | Ciaccio | 74/220 |
| 2,903,077 | 9/1959 | Kamlukin | 172/42 |
| 2,924,982 | 2/1960 | Harrer | 74/220 |
| 3,722,277 | 3/1973 | Fell et al. | 474/5 |

FOREIGN PATENT DOCUMENTS 1452128  2/1983  Japan .

Primary Examiner—James A. Leppink
Assistant Examiner—Frank H. McKenzie, Jr.
Attorney, Agent, or Firm—Kinzer, Plyer, Dorn & McEachran

[57] ABSTRACT

This is a belt drive arrangement in which two belts are used, the inside surface of one running in contact with the outside surface of the other for part of their lengths and both running within the width of one belt, with input and output shafts, and one or more idler pulleys providing forward or reverse rotation of the output shaft with the input shaft having a constant direction of rotation.

18 Claims, 6 Drawing Figures

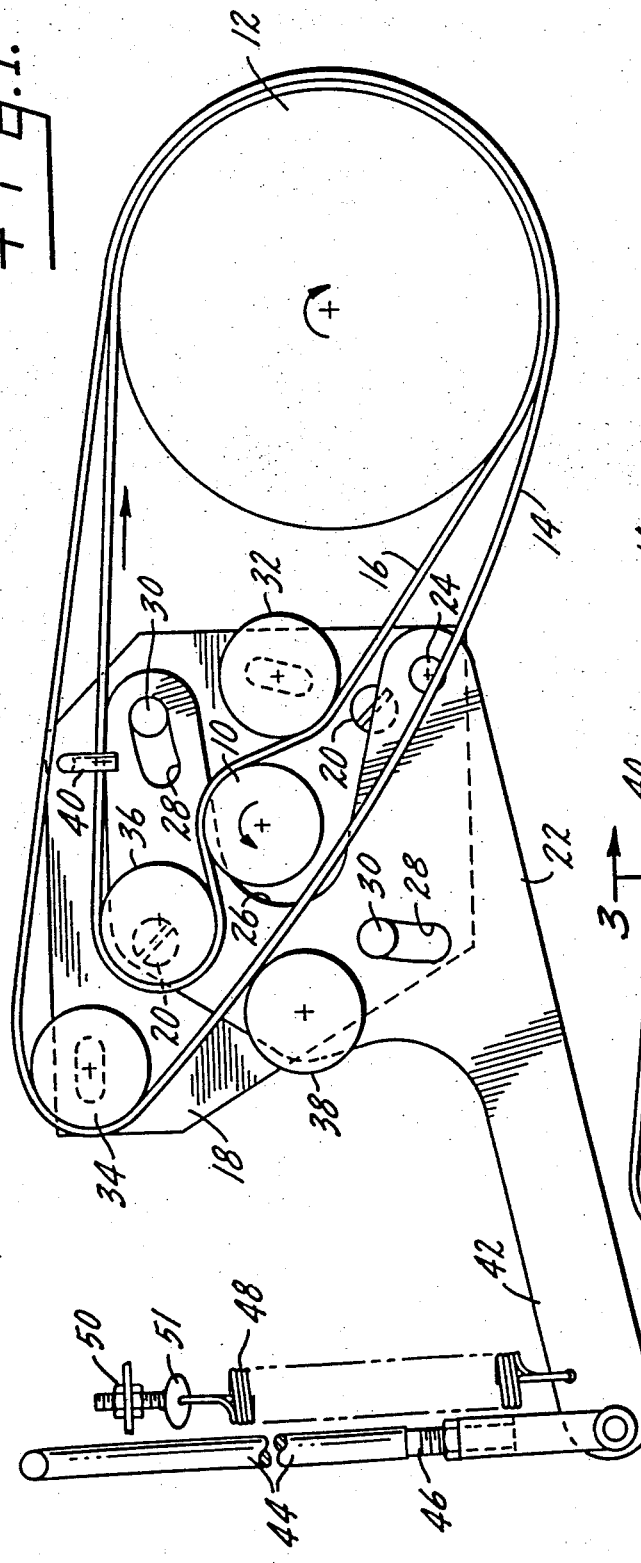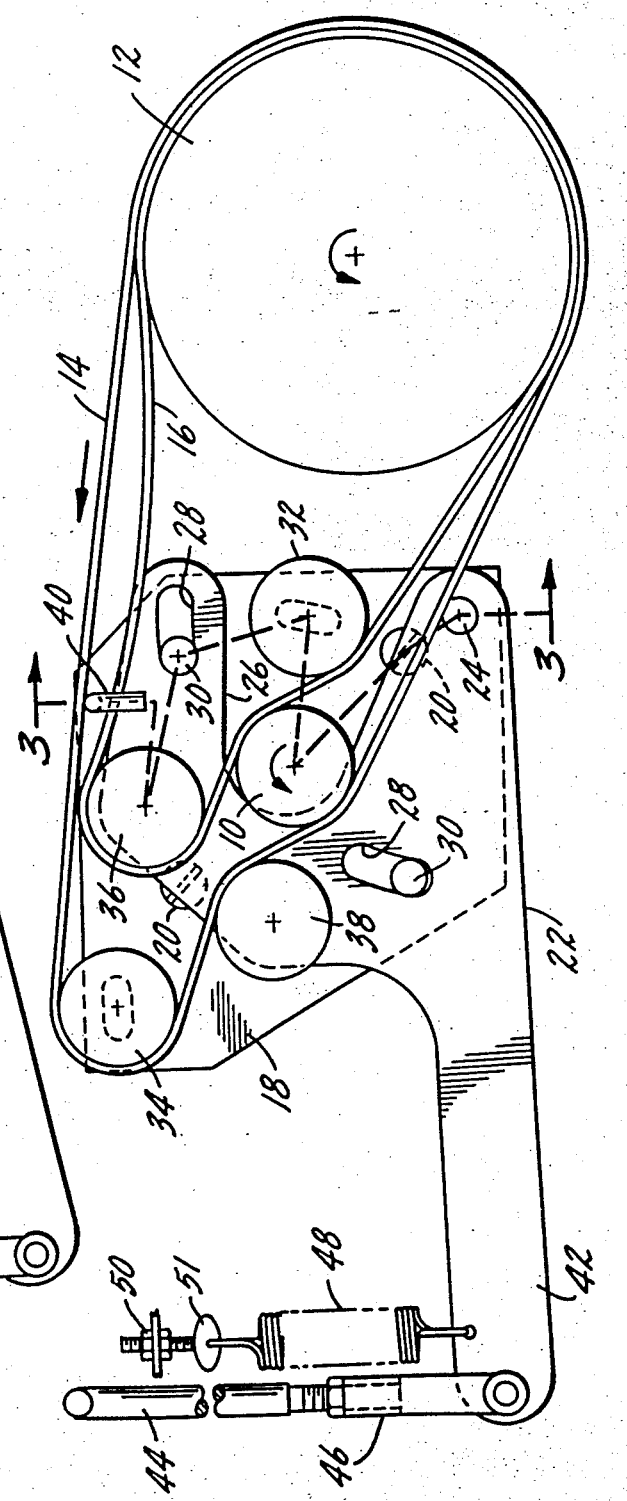

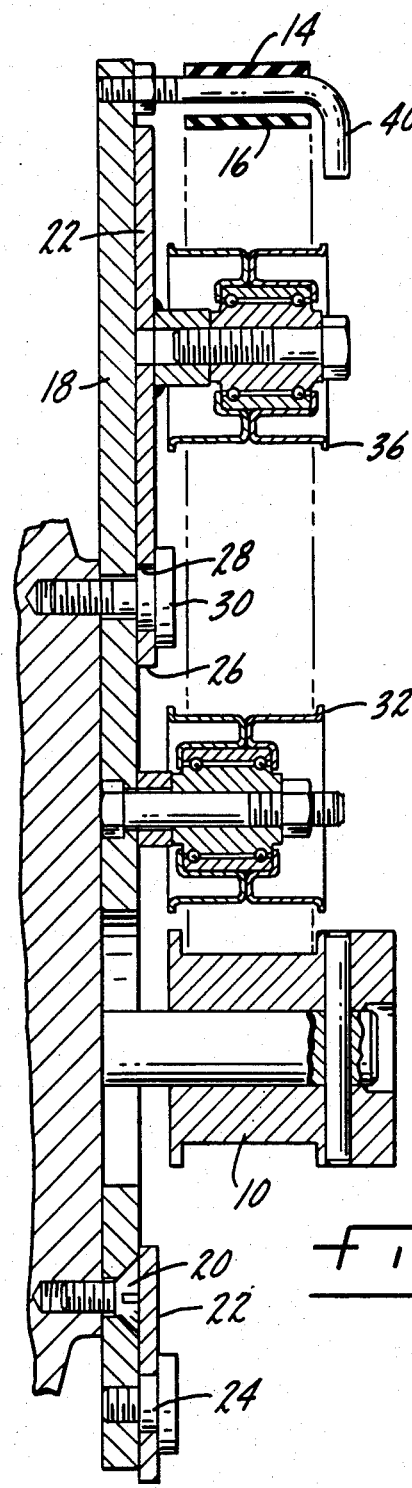
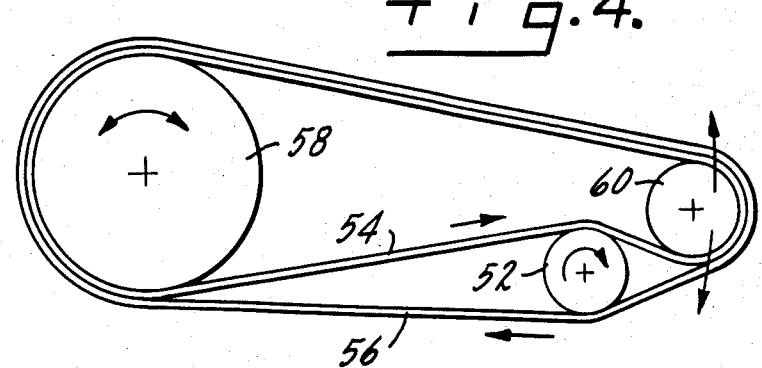
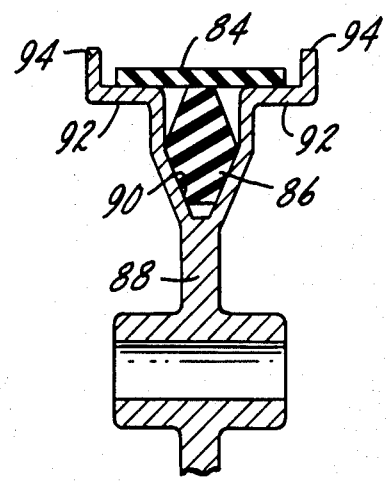
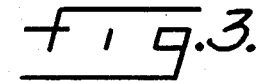
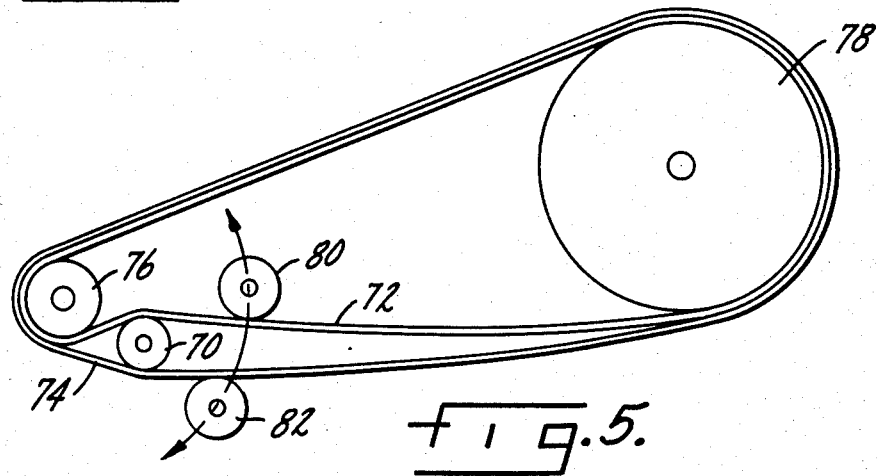

BELT DRIVE

SUMMARY OF THE INVENTION

This invention is concerned with a belt drive arrangement which is particularly adapted for low horsepower applications constrained by space limitations.

A primary object of the invention is a belt drive arrangement using two belts, one for forward and the other for reverse, with the belts both within the width of one belt and not side by side, thereby conserving space in the width of the drive.

Another object is a belt drive arrangement that minimizes the number of pulleys required.

Another object is a belt drive arrangement which provides forward, neutral and reverse with quick shifting from one to the other while the drive is running without separate clutching.

Another object is a drive which provides shifting between neutral and either forward or reverse without clutching.

Another object is a belt drive arrangement of the above type which, through belt slippage, provides variable speed in forward and reverse.

Another object is a belt drive arrangement which provides reduced cost.

Another object is a belt drive arrangement providing forward, neutral and reverse, which is particularly useful on lawn mowers, small power sweeping machines, power wheel barrows and other mobile equipment of a similar size.

Another object is a belt drive arrangement of the above type which is constructed and arranged to prevent buckling and bunching up of either of the belts.

Another object is a two-belt drive in which the inner surface of the outer belt runs in contact with the outer surface of the inner belt for part of their lengths.

Another object is a belt drive arrangement of the above type which is constructed to keep the belts separated except where they go around the output pulley.

Another object is a belt drive that is adaptable to various spatial requirements.

Another object is a belt drive of the above type using either two flat belts or an inner belt that is a two-faced V belt with an outer flat belt.

Other objects will appear from time to time in the ensuing specification and drawings.

BRIEF DESCRIPTION OF THE DRAWINGS

FIG. 1 is a side view of a belt drive in one operative position.

FIG. 2 is like FIG. 1 but a different operative position.

FIG. 3 is a section on an enlarged scale along line 3—3 of FIG. 2.

FIG. 4 is a diagrammatic side view of a modified form.

FIG. 5 is a diagrammatic side view of a further variant; and

FIG. 6 is a section of a further variant.

DESCRIPTION OF THE PREFERRED EMBODIMENT

In FIGS. 1–3, an input pulley is indicated at 10 and an output pulley at 12, an outer belt at 14 and an inner belt at 16. It will be noted that the inner surface of the outer belt is in contact with the outer surface of the inner belt where they go around the output pulley and that they are of approximately the same width and thickness, although it may be otherwise. Also, the inner belt is shorter than the outer belt.

As shown in FIG. 3, a mounting plate 18 may be suitably connected by a suitable number of mounting bolts 20 to any suitable part where the belt drive is to be used, for example, to a gasoline engine or an electric motor. The mounting plate supports or has a pivot plate 22 which is suitably pivoted as at 24 at a suitable location on the mounting plate. In the particular form shown, the pivot plate has a suitable cutout or area 26 so that its edge loops around the input or driver pulley 10. The result is that when the pivot plate moves, it has a certain degree of travel without contacting the driver pulley 10 or its shaft. The pivot plate may have a suitable number of arcuate slots 28 which fit over pins or screws 30 which set the limits of pivotal movement of the plate.

In the form shown, a pair of fixed idlers, the first an idler 32 for the inside belt and the second an idler 34 for the outside belt, are mounted on the backing or fixed plate. The idler 32 is within the cutout 26 of the pivot plate while the other idler 34 is well clear of it. It will be noted that each of these idlers is indicated in FIGS. 1 and 2 as having a slot type mounting in the fixed backing plate for purposes of adjusting belt tension. In use, they are or should be fixed.

The pivot plate 22 carries a pair of idlers that move with it, the first 36 being an idler for the inside belt and the second 38 an idler for the outside belt. These two idlers are suitably mounted on the pivot plate, are generally opposite each other but spaced somewhat as shown in FIGS. 1 and 2, and are on the opposite side of the driver pulley 10 from the driven pulley 12, which is to say they are remote from the driven pulley.

A belt guide stud 40 is mounted in the backing plate with a downturned leg or depending end as shown in FIG. 3 for purposes set forth hereinafter.

A part of the pivot plate forms an arm 42 extending away from pivot 24 with a directional control rod 44 connected to the outer end thereof, preferably through a suitable threaded clevis 46. A balancing spring 48 is connected to the lever arm and fixed at any suitable point as at 50 on the frame of the machine for purposes set forth hereinafter. Rod 44 is a control rod and is preferably operated by the user or operator, either manually or by a suitable solenoid, pneumatic or hydraulic arrangement. In most applications, it would be manually operated.

The dimensioning, spacing, and size of the various sheaves or pulleys and the thickness of the belts and their lengths is such that movement of the operating arm 42 tensions either one belt or the other against the driver pulley. It will be understood that the driver pulley always operates in one direction, shown as counterclockwise in FIGS. 1 and 2. In FIG. 1, the control lever 42 is down. This moves the movable pulleys 36 and 38 down. Movable pulley 36 will cause the inner belt to press against the driver pulley 10, which will tension the inner belt, thereby causing the output pulley 12 to move in a clockwise direction as indicated by the arrow in FIG. 1. At the same time, idler pulley 38 has been moved away from the outside of the outer belt 14 which allows it to relax, it being understood that the length of the outer belt is a little greater than the distance around idler pulley 34 and the driven pulley 12. The bottom throw of outer belt 14 will not be tensioned against the lower surface of the driver pulley 10 and, as shown in FIG. 1, is allowed to move away from it. This causes tension in the inner belt but not in the outer belt, the result being that the inner belt will drive the driven pulley 12 clockwise.

In FIG. 2, the arm 42 has been raised or moved up which also moves up movable pulleys 36 and 38. The upward movement of pulley 36 removes the tension from the inner belt 16 so that even though it may still be in contact with the top periphery of the driver pulley 10, it will not be positively moved or displaced thereby. Upward movement of the pulley 38 tensions the outside belt against the lower periphery of the driver pulley 10 which causes the belt to move counterclockwise as shown by the arrow in FIG. 2. The driven pulley 12 will reverse directions and rotate counterclockwise.

Since both belts are in contact with each other where they go around the driven pulley, when one belt is tensioned and is driving it, the other belt will also move in that direction. In the operative position of FIG. 2, the upper throw of the inner belt is slack between movable pulley 36 and the driven pulley 12, and the belt guide stud 40 holds it down or keeps it separated from the upper throw of the outer belt 14 to prevent it from flapping against the outer belt. The loose belt throw tends to whip and if it whips out and strikes the outer belt, the outer belt may jump off of one or both pulleys. The belt guide prevents this by separating the belts.

In the operative position of FIG. 2 where the driven pulley is rotated counterclockwise, the inner belt is in light contact with the driver pulley which may generate some heat but not enough to be a problem.

If desired, the surface of the driver pulley may be crowned somewhat to assist in keeping the belts aligned although this is not considered essential. It is considered more helpful to use pulleys with side flanges and to make the idler mountings as rigid as possible so that they stay parallel.

Part of the function of fixed pulley 34 is to separate the belts because the outer belt travels faster and farther than the inner belt, and if the belts are not separated but are allowed to rub on each other, the slack belt may buckle and bunch up and jam in the throat area between the movable idlers. It will be noted in the form of FIGS. 1 and 2 that the belts are separated everywhere except where they go around the driven pulley 12 and this has been found quite satisfactory.

Balance spring 48 is adjustably anchored to the frame of the machine by lock nuts as at 50. They can be used to raise or lower eye bolt 51, thereby varying the tension in balance spring 48. When properly adjusted, an operator can release directional control rod 44 and the spring 48 will support the pivot plate 44 in a position where both belts are slack, thus giving the drive a neutral setting. Forward is achieved by pushing and holding down on control rod 44 and reverse is achieved by pulling and holding up on it.

In FIG. 4, a variant form has been shown in which a driver pulley 52, shown as rotating clockwise, is between inner and outer belts 54 and 56 with a driven pulley 58 spaced therefrom and indicated to rotate either clockwise or counterclockwise. A movable idler pulley 60 is positioned inside of both belts and located remote from the driven pulley so that movement of idler pulley 60 either up or down on an arc as shown in FIG. 4 will tension one belt or the other against the driver pulley, upward movement causing the outer belt 56 to be tensioned so it will drive clockwise and downward movement tensioning the inner belt 54, causing it to drive counterclockwise. In this form, the belts may be the same length or the outer belt may be slightly longer and they are one on top of the other as in the preferred embodiment. In this variant, separating idlers and whip preventors are not necessary. It will be understood that the mounting for the various pulleys and the arrangement to move the movable pulley 60 up or down may be as before.

In FIG. 5, a further variant has been shown in which the driver pulley 70 is between the inner and outer belts 72 and 74 with a small idler pulley 76 in a fixed position remote from the large driven pulley 78. As before, the belts are one on top of the other with a pair of movable pulleys 80 and 82, one inside of and the other outside of both belts so that when they are moved together on the arc shown in FIG. 5, one belt will be tensioned against the driver pulley and the other one will be slack as previously explained.

In the cross-section shown in FIG. 6, the outer belt 84 is generally flat as before, while the inner belt 86 is a double V, both belts being shown in a pulley or sheave 88. In this case, the driver pulley would need to have a V to match the outer V on the inner belt while the driven pulley would have a corresponding V to match the inner V of the inner belt. The pulley 88 in FIG. 6 has a V groove 90 to accept and mesh with the inner V on the inner belt 86 and flat portions 92 on the outside of sufficient extent to accept the flat outer belt 84 with flanges 94, if desired, to properly center and hold the outer belt. The pulley shown in FIG. 6 may be considered to be either the driven pulley, such as 12 in FIG. 1, 58 in FIG. 4 and 78 in FIG. 5, the movable pulley 60 in FIG. 4 or the fixed idler 76 in FIG. 5, or the driver pulley 10 in FIG. 1, 52 in FIG. 4 or 70 in FIG. 5.

The use, operation and function of the invention are as follows:

Reversible belt drives are quite common but they normally involve one belt beside another, one for forward and the other for reverse. The concept of two belts, one on top of the other or, stated differently, one inside the other with the inner surface of the outer belt in contact with the outer surface of the inner belt on the driven pulley or sheave, is considered to be new and has the advantage that the space requirements for such a reversible belt drive will be greatly reduced since the arrangement only needs to be one belt wide. Also, the arrangement minimizes the number of pulleys required which, in addition to saving space, reduces costs. The arrangement, whatever form, is adaptable to a forward, neutral and reverse drive with instant shifting from one to another. Belt slippage can be used to provide variable speed in either forward or reverse. Reverse drive can be used as a brake to check forward travel and vice versa. Reverse speed can be limited by using a stop to limit engagement pressure of the reverse belt against the input pulley, and the components can be configured in a variety of ways to adapt to available space. The arrangement is considered particularly usable with lower power applications.

In those forms in which the inner belt is substantially shorter than the outer belt, when the outer belt is tensioned, it is considered desirable to use some sort of separator or stop to prevent the inner belt from whipping out into the outer belt, for example, belt guide stud 40 shown in FIGS. 1, 2 and 3. Other arrangements have also indicated that it is desirable to keep the belts out of contact with each other except where they go around a driven pulley which may be done by suitable idlers, for example, as shown in FIGS. 1, 2 and 5. Basically the arrangement is particularly adaptable for forward-reverse belt drives for low power application since its power capacity is inherently limited by the small wrap of the belts on the input pulley and also by the high degree of slippage when less than full speed is elected. One of the strengths of this type of belt drive is that the configuration is adaptable to various spatial requirements as indicated by FIGS. 1 and 5.

While the preferred form and several variations of the invention have been shown and described, it should be understood that suitable modifications, changes and substitutions may be made without departing from the invention's fundamental theme. It is therefore wished that the invention be unrestricted except as by the attended claims.

We claim:

1. In a belt drive, an input pulley, an output pulley spaced therefrom, a pair of belts one outside of the other, both belts operating within the width of one of the belts, the outer belt going around both pulleys with the input pulley being between the belts so that it is outside of the inner belt, and an idler pulley arrangement, including at least one movable idler pulley, constructed and arranged to tension either one belt or the other against the input pulley so that one belt drives the output pulley in one direction and the other belt drives it in the other direction.

2. The structure of claim 1 further characterized in that the input pulley is slightly crowned.

3. The structure of claim 1 further characterized by and including a fixed idler pulley separating the belts at a point remote from the output pulley and on the other side of the input pulley from the output pulley.

4. The structure of claim 1 further characterized in that both belts are flat.

5. The structure of claim 1 further characterized in that the movable idler pulley is on the other side of the input pulley from the output pulley.

6. The structure of claim 1 further characterized in that the movable idler pulley includes two idler pulleys generally opposite each other, one inside of both belts and the other outside of both belts.

7. The structure of claim 1 further characterized in that the outer belt is a flat belt and the inner belt is a two sided V belt.

8. The structure of claim 1 further characterized in that the movably mounted idler includes two adjacent idler pulleys, one inside of both belts and the other outside the outside belt.

9. In a belt drive, a pair of belts, one inside of the other, a driver pulley between the belts so that it is outside of the inside belt and inside of the outside belt, a driven pulley spaced from the driver pulley and inside of both belts, and a movably mounted idler arranged to alternately tension one belt or the other but not both against the driver pulley so that the driven pulley will be rotated clockwise when one belt is tensioned against it and counterclockwise when the other belt is tensioned against it.

10. The structure of claim 9 further characterized in that the size and spacing of the belts and pulleys is such that the positioning of the movably mounted idler provides for forward, neutral and reverse drive of the driven pulley.

11. The structure of claim 9 further characterized in that the driver pulley is slightly crowned.

12. The structure of claim 9 further characterized in that the movable idler pulley is positioned between the driver and driven pulleys.

13. The structure of claim 9 further characterized in that the movable idler pulley is on the side of the driver pulley remote from the driven pulley.

14. The structure of claim 9 further characterized in that the outer belt is a flat belt and the inner belt is a two sided V belt.

15. The structure of claim 9 further characterized in that the movably mounted idler includes two adjacent idler pulleys, one inside of both belts and the other inside the outside belt.

16. The structure of claim 9 further characterized by and including two fixed idler pulleys spaced from each other, the first inside of both belts with the inner belt around it and the second inside of only the outer belt, with only the outer belt around it.

17. The structure of claim 9 further characterized by and including means for keeping the belts separated except around the driven pulley.

18. In a belt drive, an input pulley, an output pulley spaced therefrom, a pair of belts with the inside surface of one running in contact with the outside surface of the other for part of their lengths and operating within the width of one of the belts, and an idler pulley arrangement constructed and arranged to tension either one belt or the other against the input pulley so that one belt drives the output pulley in one direction and the other belt drives it in the other direction.

* * * * *